United States Patent

Gabor

[15] 3,638,089

[45] Jan. 25, 1972

[54] SPEED CONTROL SYSTEM HAVING HIGH AND LOW LEVEL SPEED MEANS

[72] Inventor: Andrew Gabor, Danville, Calif.

[73] Assignee: Diablo Systems, Inc., Hayward, Calif.

[22] Filed: July 9, 1970

[21] Appl. No.: 53,532

[52] U.S. Cl. ............................318/318, 340/174.1, 346/137

[51] Int. Cl. .......................................H02p 5/00, G11b 5/82

[58] Field of Search ..................318/314, 318, 271, 391, 398; 340/174.1; 346/137; 317/5

[56] References Cited

UNITED STATES PATENTS

| | | | |
|---|---|---|---|
| 3,176,208 | 3/1965 | Gifft | 318/314 |
| 3,474,427 | 10/1969 | Stevens, Jr. | 346/137 UX |
| 3,192,461 | 6/1965 | Hohne, Jr. | 318/318 |

*Primary Examiner*—J. D. Miller
*Assistant Examiner*—Robert J. Hickey
*Attorney*—Flehr, Hohbach, Test, Albritton & Herbert

[57] ABSTRACT

A speed control system for a magnetic disk drive where a DC drive motor is integrally mounted on the spindle of the disk drive along with a blower fan. A feedback control loop compares the index marks from the disk unit in conjunction with a counter unit driven by a oscillator to provide a reference level to drive the drive motor between a high-level speed, above its normal speed, and a low-level speed, below its normal speed. During the start up period the motor is maintained at the high-level speed for faster cleaning action and the heads are also landed at this speed after cleaning has occurred. An open loop system also provides high-level and normal speeds.

13 Claims, 6 Drawing Figures

INVENTOR.
ANDREW GABOR

BY Flehr, Hohbach, Test Albritton & Herbert
ATTORNEY

INVENTOR
ANDREW GABOR
BY Flehr, Hohbach, Test, Albritton & Herbert
ATTORNEYS

INVENTOR
ANDREW GABOR
BY Flehr, Hohbach, Test, Albritton & Herbert
ATTORNEYS

SPEED CONTROL SYSTEM HAVING HIGH- AND LOW-LEVEL SPEED MEANS

BACKGROUND OF THE INVENTION

The speed control of driven elements such as magnetic disk units is, of course, very critical. In the past, belt drives have been used along with alternating current synchronous motors. The use of a belt drive with an AC motor also caused variations of speed due to changes in line frequency or voltage and resulting from belt wear, pulley tolerances and slippage.

An air blower for cleansing the magnetic disk of dust particles is also necessary since the read/write heads are positioned at an almost microscopic distance from the disk. Such a blower system is usually a separate system distinct from the disk drive. All of the foregoing necessitated a large overall size package and a relatively complex mechanical configuration.

OBJECTS AND SUMMARY OF THE INVENTION

It is therefore a general object of the present invention to provide an improved speed control system;

It is another object of the invention to provide a speed control system which is especially useful in conjunction with disk drives for magnetic storage disks.

It is another object of the invention to provide a speed control system as above which is highly accurate in eliminating variations due to frequency or voltage.

It is another object of the invention to provide a speed control system as above which provides a simple and compact package both for the driving function and for the air blower necessary for cleansing.

In accordance with the above objects there is provided a speed control system for a driven element comprising drive motor means adapted for coupling to said driven element and having a high level speed means and low level speed means. The driven element has a predetermined normal rotational speed. The high level speed means provide a speed greater than the normal speed and the low level speed means provide a speed lower than the normal speed but greater than zero. Means are provided for sensing the rotational speed of the motor means and reference means provide a fixed reference level. Means are responsive to the sensing means for comparing the actual rotary speed with the fixed reference level. These means activate the high-speed level means of the motor means in response to the actual rotary speed being below the reference level and activates the low level speed means in response to the actual rotary speed being above the reference level.

BRIEF DESCRIPTION OF THE PREFERRED EMBODIMENTS

Figure 1:
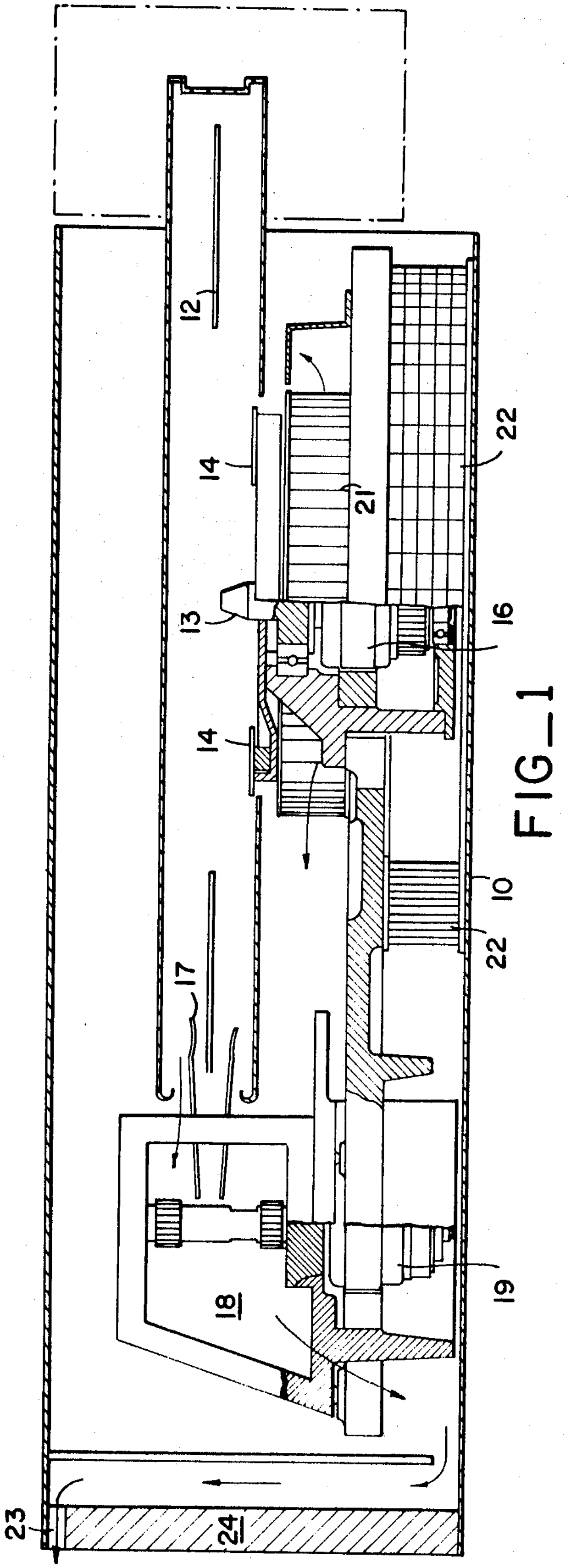
FIG. 1 is a cross-sectional view partially cut away of the disk drive unit embodying the speed control system of the present invention.

Referring first to FIG. 1 the disk drive unit is illustrated which is contained within a cabinet 10. Inserted into the right-hand end of the cabinet is a disk cartridge 11 having a rotatable magnetic memory disk 12. In a manner well known in the art this is centered on a spindle 13 which has an annular flange 14 to which the disk 12 is coupled for rotation. Driving the spindle or shaft 13 is a DC motor generally indicated at 16. Read/write heads 17 are positioned over disk 12 by means of a rack and pinion arrangement 18 which is coupled to a positioning servomotor 19. Details of the head-positioning servosystem are shown in a copending application filed in the name of Andrew Gabor, Ser. No. 23,569, filed Mar. 30, 1970 entitled "Apparatus For The Measurement of Relative Velocity Between Two Relatively Movable Members." Also mounted on spindle or shaft 13 in addition to motor 16 is a blower impeller 21 which draws outside air through the filter 22 to clean the disk 12 and in fact the entire interior of the cabinet 10 of any dust particles which would otherwise interfere with the head 17 and the disk 12. The heads are normally spaced with a clearance smaller than a normal dust particle diameter.

Air exits through an aperture 23 in the rear wall 24 of cabinet 10. A portion of the air is recirculated to provide more effective cleaning action as disclosed in a copending application entitled Air Circulation Apparatus Ser. No. 71,893 filed Sept. 14, 1970 in the name of Andrew Gabor.

Rear panel 24 also supports the necessary electrical circuitry for operation of the speed control system of the present invention. Such circuitry is shown in block diagram form in FIG. 2 where the disk cartridge 11 is shown as being driven by the DC powered drive motor 16. This is adjacent the head control unit 18. Disk cartridge 11 provides in a manner well known in the art an output on line 32 of index marks which are electrical pulses produced with every revolution of the disk. These are produced by an electromagnetically sensed notch in the bottom drive plate of the disk cartridge which is common to most commercially produced cartridges.

Figure 5:
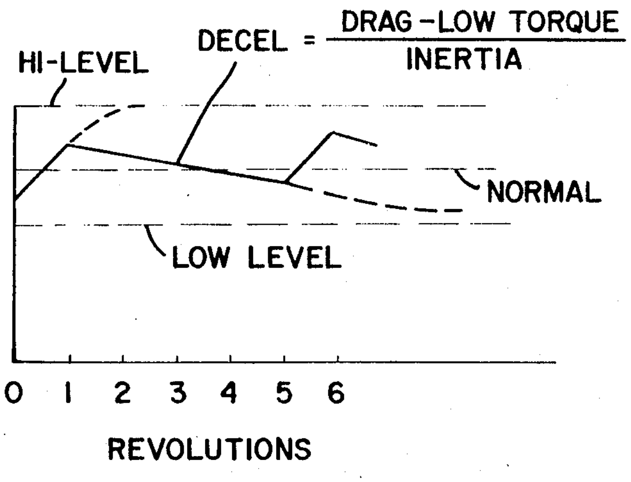
FIG. 5 is a characteristic curve of the rotary speed of a driven element as controlled by the speed control system of the present invention.

Drive motor 16 includes means 26 for driving it at a high-speed level and means 27 for driving it at a low-speed level. Normally the disk has a normal predetermined rotational speed depending on the type of use for which it is intended. In accordance with the present invention high drive tends to drive the disk toward a maximum speed which is approximately 30 percent greater than the normal speed and the low level drive means 27 tends to drive the disk at a minumum speed which is at least 20 percent less than the normal speed. These speeds, as will become apparent below, are never actually reached in normal operation. Rather as shown in FIG. 5 these speeds fluctuate between the high and low levels around the normal speed with a regulation of less than 1 percent.

Figures 2, 3:
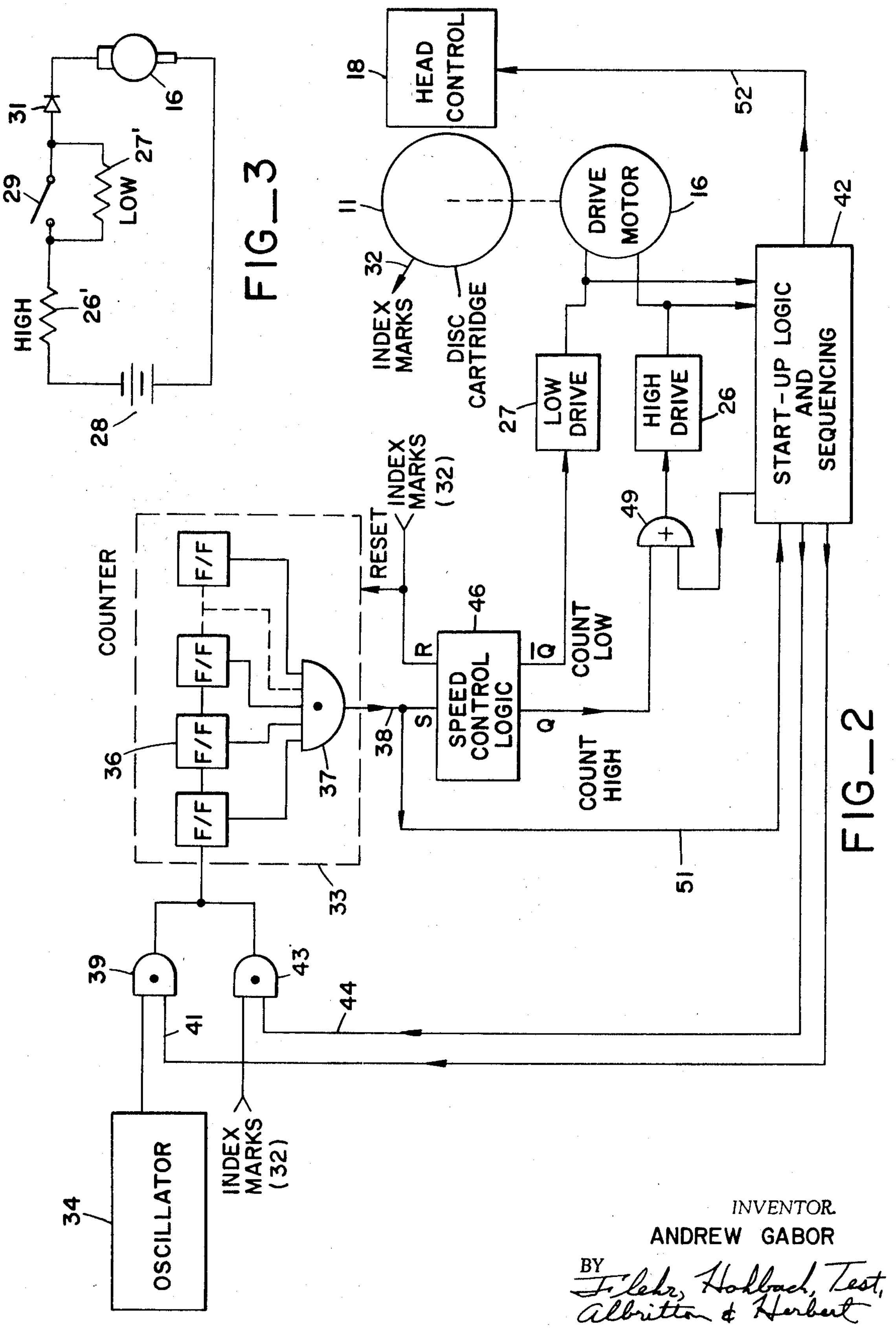
FIG. 2 is a block diagram showing the operation of the speed control system of the present invention.
FIG. 3 is a circuit schematic illustrating the operation of a portion of FIG. 2.

An example of a typical high-low speed control for a DC drive motor is shown in schematic form in FIG. 3 where a DC source 28 drives the motor 16 through a high-speed level resistor 26′ and a low-speed level resistor 27′. Thus for high drive conditions the switch 29 would be closed and for low drive open. The diode 31 prevents dynamic breaking of the motor during deceleration by limiting current flow to only one direction. FIG. 3 is only a typical two level speed control circuit for a DC drive motor and, of course, many others would be available. For example, an operational amplifier might be used where the DC supply source is in effect a constant current source. Also an emitter follower type amplifier can be used as a constant current source.

Referring again to the remainder of the circuit of FIG. 2 the index marks output 32 serves as means for sensing the rotational speed of motor 16 and of the accompanying disk of the disk cartridge 11.

Reference means providing a fixed reference level to which the actual rotational speed of the disk 11 may be compared are in effect provided by a counter 33 in conjunction with a oscillator 34. More specifically, counter 33 includes several flip-flops 36 four of which are illustrated, having outputs coupled into an AND-gate 37. When the flip-flops count up to their maximum count this produces a coincidence input at the AND gate to produce an output on the line 38. The maximum count is $2^N$ where N is the number of flip-flops 36. The counter 33 is driven normally by the oscillator 34 through an AND-gate 39 which is open or closed by a second coincidence input 41 from a start up logic and sequencing unit 42. The alternative source of driving pulses to counter 33 is from the index marks output of disk cartridge 11 which is coupled to an AND-gate 43. This gate also has as its coincidence input on a line 44 control information from sequencing unit 42.

Thus, the counter 33 provides an output 38 which indicates a given time interval. More specifically, the frequency of oscillation of oscillator 44 is equal to the predetermined count of counter 33 which will produce an output on line 38 of AND-gate 37 divided by the time required by 1 revolution of the disk unit 11 at its normal speed. For each revolution, of course, an index mark will be produced. Thus, it is apparent that by comparing the index marks to the output 38 of AND-gate 37 an error signal will be developed which when used to drive the high and low drive units 26 and 27 will maintain the speed of drive motor 16 substantially at the normal speed.

More particularly, the comparing is accomplished by a speed control logic unit 46 which operates in a manner similar to a flip-flop circuit. However logic unit 46 includes additional timing and logic circuit. Logic unit 46 has a set terminal S driven by the output of AND-gate 37 and a reset terminal R driven by the index marks output 32. The outputs of the logic unit designated Q and $\overline{Q}$ respectively drive high unit 26 and low drive unit 27.

The Q output of logic unit 46 is coupled to high drive unit 26 through an OR-gate 49 which has as its other input a control signal from the start-up logic and sequencing unit 42. This is for the purpose of enabling the high drive unit during the start up procedure to aid in the cleansing of the disk cartridge unit 11.

Figure 4:
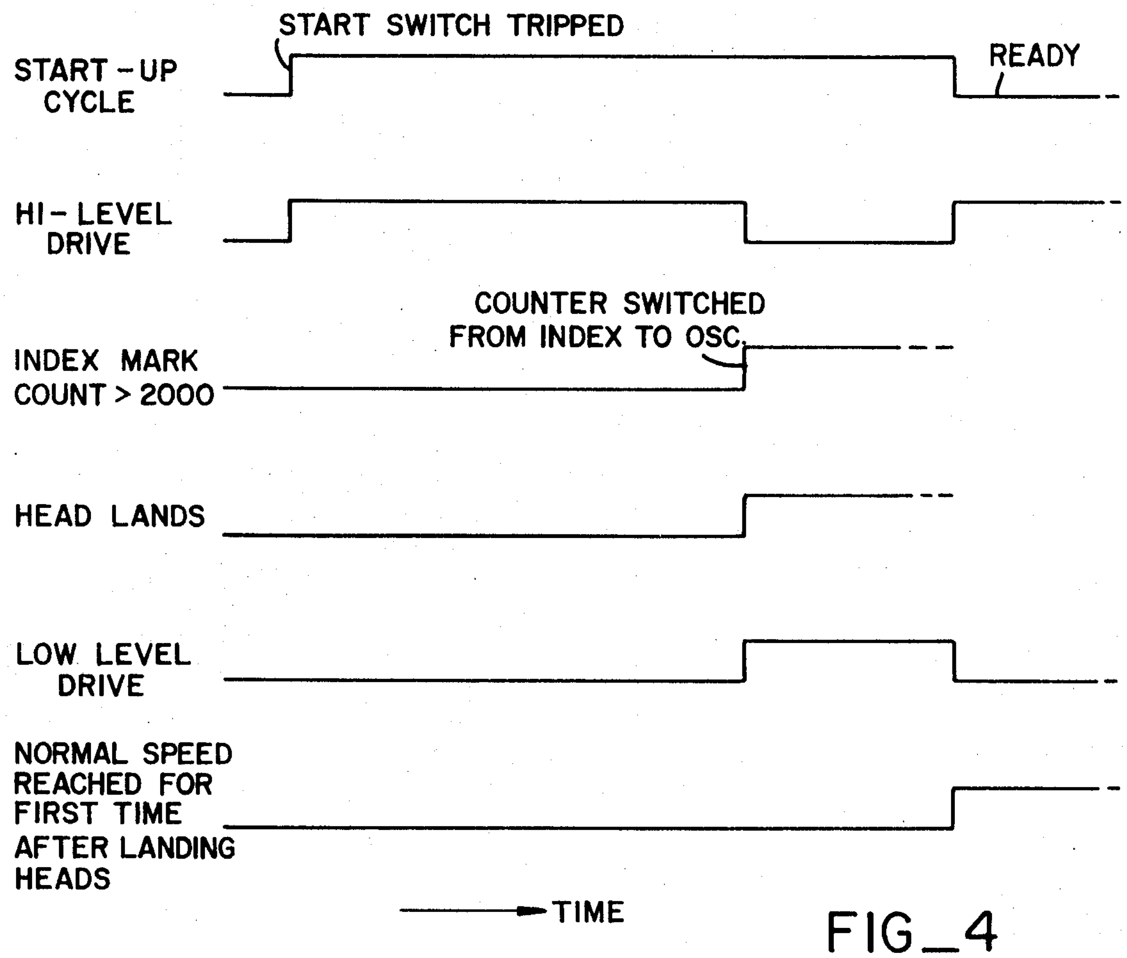
FIG. 4 is a timing diagram useful in understanding the block diagram of FIG. 2.

The operation of the speed control system is best discussed in conjunction with FIG. 5. Essentially, the system must be started and the blower allowed to run a sufficient amount of time to cleanse dust particles out of the disk unit before the heads 17 as shown in FIG. 1 are lowered. This is termed the start-up cycle which is illustrated in the first timing diagram of FIG. 4. The start of the cycle is initiated when a start switch is tripped. This actuates sequencing unit 42 (FIG. 2) to cause the high drive unit 26 to be actuated. At this time the disk rapidly accelerates to the high level speed which as discussed above is 30 percent greater than the normal speed. This produces an air flow which is twice the amount delivered at the normal speed since the relationship between blower speed and air flow is normally nonlinear. Thus, the disk is rapidly cleansed of dust particles. The timing for this start up period is conveniently provided by the index marks which, when AND-gate 43 is open, will drive the counter 33. Since an index mark occurs only every rotation of the disk unit 11 this is significantly slower than the oscillator frequency which in the present embodiment is 2,000 times faster. In other words, the oscillator 34 produces during a normal revolution 2,000 pulses to drive the counter to its maximum count of 2,000 which will then produce an output on line 38 of AND-gate 37. Thus, the start up period is 2,000 index marks. Upon reaching 2,000 index marks an output on line 38 is sensed by the sequencing device 42 through the line 51. The sequencing unit 42 through lines 41 and 44 switches the counter unit into normal operation with oscillator 43 driving the counter. This is indicated in FIG. 4 by the timing diagram labeled "index mark count greater than 2,000." At this time since the speed of the disk unit is obviously higher than its normal desired speed the logic unit 46 will be reset to actuate the low drive unit 27. Such resetting occurs by use of the index marks in conjunction with the lack of an output on the set line 38. Such will be the case since the oscillator 34, with the disk at a high speed, will never cause the counter to reach 2,000 before both the counter and unit 46 are reset by the index marks.

In accordance with the invention, while the disk unit is at the high-speed level and after the start-up period has substantially ended the head is landed on the disk. In other words, it is moved into its normal tracking position. This mode of landing minimizes risk of the head touching the surface of the magnetic disk since the relatively higher speed of the disk creates an air bearing of increased capacity to cushion any landing.

Sequencing unit 42 accomplishes the foregoing by signalling the head control unit 18 through the line 52 it receives the indication on line 51 that the 2,000 index marks have been counted.

After switching from a high to a low speed the disk 11 decelerates below the normal speed and, as illustrated in FIG. 5, when the counter 33 has been able to count to 2,000 or more during one revolution logic unit 46 actuates the high drive unit 26 to again accelerate the disk unit. From inspection of FIG. 5 it is apparent that such acceleration occurs within approximately 1 revolution interval. At the end of this revolution, the logic unit 46, of course, is reset by the index mark and thus deceleration will occur until the disk falls below the normal speed for at least a full revolution. Thus, the index marks serve as an actual measure of the speed of disk 11, the counter 33 serves as a reference means, and logic unit 46 compares the two to provide the control loop action discussed above. In actual practice it has been found that the hunting of this servosystem of the present invention is less $\pm 1$ percent.

The use of high- and low-speed levels which are 30 percent and 20 percent greater or less than the normal speed is essentially determined by the slopes as illustrated in FIG. 5 of the acceleration and deceleration characteristics. Deceleration is determined as indicated in FIG. 5 by the drag of the system minus the torque provided by the motor at low speed divided by the inertia of the system. The torque of the motor at low speed makes the deceleration characteristic much more gradual than if the motor were allowed to coast. For example, deceleration normally is determined by the torque produced by the frictional drag divided by inertia. When this drag is substantially compensated for, deceleration will be much less. This greatly improves the speed regulation characteristics as illustrated in FIG. 5 by limiting the swing of the speed above and below the normal speed level. Thus, from examination of FIG. 5 it is apparent that in practice deceleration will occur at least over 2 or 3 revolutions. If the deceleration slope is too steep or occurs in less than 1 revolution it is apparent that for good speed control regulation that samples must be taken more often than 1 revolution. Thus, by control of the slope making it more shallow by the use of a low-speed level this difficulty is overcome. The specific value of 20 percent below normal speed is determined by approximating the minimum drag which could occur with good bearings and low-density air and taking it into consideration the current sensitivity of the motor. If the low level speed were placed too close to the normal speed, in some situations an unstable situation would result causing the deceleration curve to reverse slope or become almost flat.

Referring again to FIG. 4 after the oscillator begins driving the counter unit the normal phase of speed control is rapidly reached and thus when the high drive is again actuated the start-up cycle diagram indicates that the disk unit is now "ready" to be written or rewritten upon or to readout its information.

Figure 6:
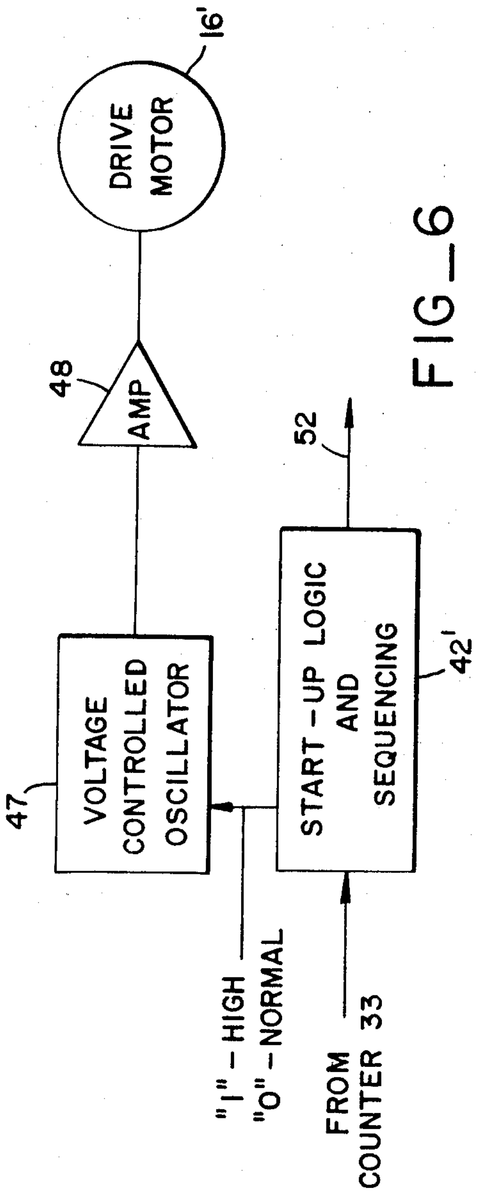
FIG. 6 is a block diagram of another embodiment of the invention.

When an open loop control system is desired the system of FIG. 2 may be modified as shown in FIG. 6. Here an AC drive motor 16' is used whose rotational speed is controlled by the frequency of the signal from a voltage controlled oscillator (VCO) 47 coupled to motor 16' through an amplifier 48. VCO 47 is controlled by a modified sequencing unit 42' which provides a "1" control signal to cause the VCO to generate a high-frequency signal to place motor 16' in its high-speed condition; a "0" control signal provides the normal speed.

A high speed at start-up is provided by the sequencing unit 42' which is coupled to the counter 33 circuitry in the same manner as the closed loop circuit. However the counter would be used only for timing the start-up period. After the loading of the read/write heads, sequencing unit 42' switches VCO 47 to its normal speed frequency.

Thus, the present invention provides an improved speed control system for a disk unit by use of a control loop with high and low level drive where a minimum of hunting is provided by proper selection of the drive levels. By the use of integral mounting for the blower on the motor the high-drive capacity of the motor can be used to provide for faster cleansing. This also has the concomitant benefit of providing increased air bearing capacity to thus prevent accidental damage during head landing. Circuitry is simplified through sharing the use of components such as the counter unit for both the control feedback loop and the start-up sequence cycle. An open loop system is also provided with an AC drive motor.

I claim:

1. A speed control system for a driven element comprising: drive motor means integrally mounted to a shaft to which a magnetic disk storage unit may be coupled for rotation, said drive motor means having a high level speed means and low level speed means; said shaft and disk unit having a predetermined normal rotational speed, said high level speed means providing a speed greater than said normal speed and said low level speed means providing a speed lower than said normal speed but greater than zero; air blower means integrally mounted on said shaft for cleansing said disk unit; means for sensing the rotational speed of said motor means; reference means providing a fixed reference level, means responsive to said sensing means for comparing said actual rotary speed with said fixed reference level such means activating said high-speed level means of said motor means in response to said actual rotary speed being below said reference level and activating said low level speed means in response to said actual rotary speed being above said reference level; logic means for initiating a start-up period and for activating said high level speed means; and means for timing said start-up period.

2. A speed control system as in claim 1 where said reference means includes a counter and an oscillator said oscillator driving said counter, said counter producing an indication of reaching a predetermined count which is said fixed reference level, said speed sensing means providing a marker for each revolution, said comparing means including means coupling said counter to said high level and low level speed means; said coupling means being responsive to said indication of reaching said predetermined count and to a revolution marker of said speed sending means for activating said high level speed means if said indication occurs before said marker.

3. A speed control system as in claim 2 where said oscillator has a frequency of oscillation equal to said predetermined number of counts divided by the time required for 1 revolution of said motor means at said normal speed.

4. A speed control system as in claim 2 where coupling means include speed control means having set and reset conditions, said control means being set by said count indication and reset by said revolution marker said latch in said set condition activating said high level speed means and in said reset condition said low level speed means.

5. A speed control system as in claim 4 where said counter is reset by said revolution marker.

6. A speed control system as in claim 1 where said high level speed means produces a maximum speed at least 30 percent greater than said normal speed and said low level speed means produces a minimum speed at least 20 percent less than said normal speed.

7. A speed control system as in claim 1 where said reference means includes a counter and an oscillator said oscillator driving said counter said counter producing an indication of reaching a predetermined count which is said reference level and where said speed sensing means provides a marker for each revolution and where said means for timing said start-up period includes means for coupling said counter to said speed sensing means said indication of said predetermined count signalling the end of said start-up period.

8. A speed control system as in claim 1 together with read/write heads for said disk unit and means for landing said heads at the end of said start-up period but when said high level speed means is still activated.

9. A speed control system as in claim 1 where said motor means and said driven element have inertia and a frictional drag at said normal speed said low level speed means providing a torque for said motor means which is less than but substantially compensates for said drag to provide a deceleration characteristic which is relatively gradual with respect to the time required for one revolution at said normal speed.

10. A speed control system for a disk drive comprising: drive motor means integrally mounted to a shaft to which a magnetic disk unit may be coupled for rotation, said drive motor means having a high level speed means and low level speed means, said drive motor means and said disk unit having a predetermined normal rotational speed, said high level speed means providing a speed greater than said normal speed, said low level speed means providing a speed lower than said normal speed but greater than zero, air blower means integrally mounted on said shaft for cleansing said disk unit, means for controlling the speed of said motor means and said disk unit for selectively actuating said high and low level speed means to provide an average normal rotational speed, logic means for initiating a start-up period for activating said high level speed means and means for timing said start-up period.

11. A speed control system as in claim 10 together with read/write heads for said disk unit having a spaced position and a normal tracking position and means for moving said heads to said normal tracking position at the end of said start-up period but when said high level speed means is still activated.

12. A speed control system for a disk drive comprising: drive motor means integrally mounted to a shaft to which a magnetic disk unit may be coupled for rotation, said drive motor means having high level and normal speed means, said high level speed being greater than said normal speed, air blower means integrally mounted on said shaft for cleansing said disk unit, read/write heads for said disk unit having a spaced position and a normal tracking position, sequencing means for activating said high level speed means during a start-up period, for moving said heads to said normal tracking position at the end of the start-up period, and for thereafter activating said normal speed means.

13. A speed control system as in claim 12 where said motor means includes an AC type motor, a voltage controlled oscillator power source, and means included in said oscillator for causing said oscillator to selectively generate either of two predetermined frequencies corresponding to said high and normal speeds such means being responsive to said sequencing means for said frequency selection.

* * * * *